Patented June 16, 1953

2,642,456

UNITED STATES PATENT OFFICE 2,642,456

N-CARBOXYALKYL-α-AMINO TOLUIC ACIDS AND THEIR ALKYL ESTERS

William S. Emerson and Robert A. Heimsch, Dayton, Ohio, assignors to Monsanto Chemical Company, St. Louis, Mo., a corporation of Delaware No Drawing. Application April 25, 1950, Serial No. 158,074

8 Claims. (Cl. 260—471)

This invention relates to new aralkyl amino dicarboxylic acids and esters of the same.

The new dicarboxylic compounds are N-carboxyalkyl-α-amino toluic acids and their alkyl esters having the general structure:

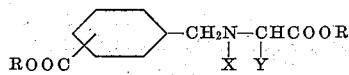

in which R is a member of the group consisting of hydrogen and alkyl groups of from 1 to 8 carbon atoms and X and Y are members of the group consisting of hydrogen and alkyl groups of from 1 to 4 carbon atoms.

The present new aminodicarboxylic acids or their dialkyl esters are readily obtainable by contacting an α-halotoluic acid or an alkyl α-halotoluate with an α-amino acid or its ester, the reaction proceeding according to the scheme:

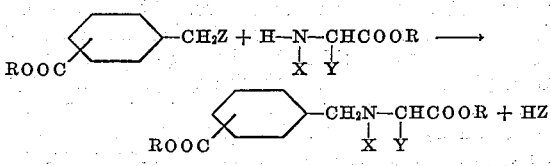

in which Z is a member of the group consisting of chlorine, bromine and iodine, R is a member of the group consisting of hydrogen and alkyl groups of from 1 to 8 carbon atoms, and X and Y are members of the group consisting of hydrogen and alkyl radicals of from 1 to 4 carbon atoms. The toluic acid compounds which may be employed include, e. g., α-chloro-4-toluic acid, α-bromo-2-toluic acid, α-iodo-3-toluic acid and alkyl esters of such acids in which the alkyl group has from 1 to 8 carbon atoms. As illustrative of amino acid compounds which may be employed may be mentioned glycine, sarcosine, α-alanine, leucine, isoleucine, norleucine, paline and esters of the same with aliphatic alcohols of from 1 to 8 carbon atoms.

When employing glycine or its esters as the amino acid component there are obtained compounds having the general formula:

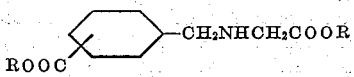

in which R is a member of the group consisting of hydrogen and alkyl radicals of from 1 to 8 carbon atoms, e. g., N-carboxymethyl-α-amino-4-toluic acid, butyl N-carboxymethyl-α-amino-3-toluate, etc.

With sarcosine or its esters, the compounds which are obtained have the general formula:

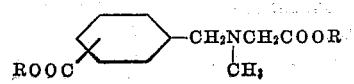

in which R is as defined above. As illustrative of compounds having this structure may be mentioned N - carboxymethyl-N-methyl-α-amino-2, 3- or 4-toluic acid, methyl N-carbomethoxymethyl-N-methyl-α-amino-4-toluate, butyl N-carbobutoxymethyl-N-methyl-α-amino-2-toluate, 2-ethylhexyl N-carbo(2-ethylhexyl)oxy-N-methyl-α-amino-3-toluate, n octyl N-carbooctyloxymethyl-N-methyl-α-amino-4-toluate, isopropyl N - carboisopropoxymethyl-N-methyl-α-amino-4-toluate, etc.

Still another group of compounds provided by the present invention includes those obtainable by employing leucine or its alkyl esters as the amino acid compound and having the general formula:

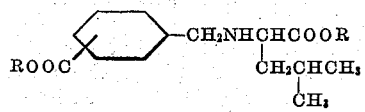

in which R is as defined above, e. g., N-(α-carboxy-α-isobutylmethyl)-α-amino-4-toluic acid.

Depending upon the nature of the individual reactants, the condensation may occur under varying conditions of temperature and/or pressure. For optimum yields, however, it is advantageous to reflux the mixture of the toluic acid compound and the amino acid compound in a suitable solvent. Also while the present amino dicarboxylic compounds are obtainable by conducting the reaction in the absence of any extraneous material, we have found that optimum yields are obtained by employing in the reaction mixture a basically reacting material which serves to neutralize the hydrogen halide evolved during the condensation. Basically reacting materials which may be employed include alkali and alkali metal hydroxides, e. g., sodium, potassium, lithium, calcium, or magnesium hydroxide; basically reacting salts such as sodium carbonate, potassium acetate, etc.

As herein stated alkyl esters of the amino acids may be used instead of the free acids. Thus, reaction of an ester such as the ethyl ester of sarcosine with ethyl α-chloro-4-toluate will yield ethyl N-carboethoxymethyl-N-methyl-α-amino-4-toluate, the methyl ester of sarcosine with α-bromo-3-toluic acid will yield N-carbomethoxymethyl-N-methyl-α-amino-3-toluic acid, etc. Mixed esters are thus obtainable, e. g., condensation of the methyl ester of sarcosine with isopropyl α-chloro-4-toluate will give isopropyl N-carbomethoxymethyl-N-methyl-α-amino-4 - toluate.

Dialkyl esters of the present dicarboxylic acids also are obtainable by esterifying the free acids with an unsubstituted, aliphatic saturated alcohol of from 1 to 8 carbon atoms, preferably in the presence of an esterifying catalyst. The higher alkyl esters, e. g., N-carboalkoxyalkyl-α-aminotoluates in which the alkoxy group has from 4 to 8 carbon atoms are more advantageously prepared; however, by an interchange reaction whereby a lower dialkyl ester of an N-carboxyalkyl-α-aminotoluic acid, for example, the dimethyl ester is reacted with an unsubstituted, aliphatic saturated alcohol of from 4 to 8 carbon atoms in the presence of an esterifying catalyst.

Catalysts of general utility in the trans-esterification are basic materials, for example, potassium ethylate, metallic sodium, sodium hydroxide, sodium methylate, etc. In both esterifying procedures, formation of the desired esters occurs to some extent at ordinary room temperatures; however, in order to obtain good yields we prefer to operate at refluxing temperatures while removing from the reaction zone either the water which is given off during the direct esterification or the lower alcohol generated in the interchange reaction.

The present N-carboxyalkyl-α-aminotoluic acids and their lower alkyl esters are solids, or stable, highly boiling, viscous liquids, which may be advantageously employed in the chemical and allied industries for a wide variety of purposes. A number of the free acids, e. g., the N-carboxymethyl-N-methyl-α-amino-2-, 3- or 4-toluic acids and the dialkyl esters thereof may serve as intermediates in the production of synthetic fibers of the polycarboxylamide type, and in the production of non-ionic wetting-out and detersive agents.

Dialkyl esters of the present N-carboxyalkyl-α-aminotoluic acids in which the alkyl groups have from 4 to 8 carbon atoms are highly efficient plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. We have found that very good low temperature flexibility is imparted to vinyl chloride polymers when the present esters are employed as plasticizers for such polymers.

The present esters are valuable plasticizers for polyvinyl chloride and copolymers of at least 70 per cent by weight of vinyl chloride and up to 30 per cent by weight of an unsaturated monomer copolymerized therewith, for example vinyl acetate, vinylidene chloride, etc.

We have found these esters serve not only to soften vinyl chloride polymers, but also to impart simultaneously a high degree of low temperature flexibility, very good temperature stability and great mechanical strength to these polymers. The esters are compatible with vinyl chloride polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl chloride composition exhibits an arbitrarily established minimum flexibility is defined as the Low Temperature Flexibility of the composition. This value may also be defined as the lower temperature limit of the plasticized composition's usefulness as an elastomer.

*Water resistance.*—The amount of water absorption and the amount of leaching that takes place when the plasticized composition is immersed in distilled water for 24 hours is determined.

The invention is further illustrated, but not limited, by the following examples:

*Example 1*

Two hundred eight grams (1.1 moles of α-chloro-4-toluyl chloride was hydrolyzed by heating with a mixture of 1500 cc. of water and 45 g. of sodium hydroxide. To the resulting hydrolysis product (comprising α-chloro-4-toluic acid in an aqueous solution of sodium chloride) there was added a solution of 150 g. (1.2 moles) of sarcosine hydrochloride, 140 g. of sodium hydroxide and 500 cc. of water, and the whole was refluxed for a time of 18 hours. At the end of that time the reaction mixture was filtered and the filtrate was acidified with hydrochloric acid to a pH of 2. Solid material was recovered by repeated subsequent filtration and evaporation followed by filtration. When the volume of the filtrate was reduced to about 200 cc. it was treated with an equal volume of acetone and filtered. All of the solids thus obtained were combined and dried, a total of 507 g. of solids being obtained in this manner. The solid product thus obtained comprised a mixture of N-carboxymethyl-N-methyl-α-amino-4-toluic acid, sodium chloride and probably some sodium hydroxide.

Methyl N-carbomethoxymethyl - N - methyl-α-amino-4-toluate was prepared by refluxing the 507 g. of solids with 2.5 liters of methanol and 50 cc. of sulfuric acid for 17 hours. At the end of that time the entire reaction mixture was submitted to distillation under reduced pressure until its volume had been reduced to approximately one liter. This residue was then treated with one liter of water and extracted 5 times each with 75 cc. of benzene. The benzene extracts were combined, neutralized and washed twice with 50 cc. of water. After drying over calcium chloride the combined extracts were distilled at reduced pressure to yield 179.0 g. (64.8 per cent theoretical yield) of methyl N-carbomethoxymethyl-N-methyl-α-amino-4-toluate, B. P. 163° C. to 177° C./1.2 to 1.4 mm. of Hg, $n_D^{25}$=1.5245.

*Example 2*

This example shows the preparation of 2-ethylhexyl N - carbo(2 - ethylhexyl)oxy - N-methyl-α-amino-4-toluate from the methyl ester of the preceding example.

A mixture consisting of 37 g. (0.147 mole) of methyl N - carbomethoxymethyl - N - methyl- α-amino-4-toluate, 65 g. (0.5 mole) of 2-ethylhexanol and 1.0 g. of sodium methylate was placed in a flask fitted with a 24 inch Vigreux column and refluxed for 58 hours under slightly reduced pressure with the pot temperature being from 145 to 155° C. During the refluxing, methanol was removed as it was formed, and an additional 3.0 g. of sodium methylate was added in portions at intervals during the refluxing. The reaction mixture was then washed with water to dissolve the catalyst (sodium methylate), then with 50 cc. of 5 per cent aqueous acetic acid and subsequently with 25 cc. of 1 per cent aqueous sodium bicarbonate for neutralization. The whole was then washed 3 times with 50 cc. of water, 1 g. of charcoal (Norite) was added, and the solvent and unreacted 2-ethylhexanol were distilled off. The residue was then heated at a temperature of 165° C./0.25 mm. of Hg for a time of 1.5 hours in order to drive off low-boiling materials. Filtration of the product to remove the charcoal gave 35 g. of 2-ethylhexyl N-carbo- - (2 - ethylhexyl)oxymethyl-N-methyl-α-amino - 4 - toluate, molecular refraction 131.7 (calcd. 130.73), and analyzing as follows:

| | Calcd. for $C_{27}H_{45}O_4N$ | Found |
|---|---|---|
| Percent C: | 72.48 | 73.00 |
| Percent H: | 10.06 | 9.72 |

The reaction of other alcohols of from 4 to 8 carbon atoms, instead of 2-ethylhexanol, with methyl N - carbomethoxymethyl - N - methyl-α-amino-4-toluate may be effected similarly, for example, with n-hexanol and the dimethyl ester to yield n-hexyl N-carbo-n-hexyloxymethyl-N-methyl-α-amino-4-toluate, and with isobutanol to yield isobutyl N-carboisobutoxymethyl-N-methyl-α-amino-4-toluate, etc. When working with the higher alcohols, the diethyl ester instead of the dimethyl ester may be used for the interchange reaction. Also, instead of using the 4-isomers, the 2- or 3-isomer may be employed, i. e., the dimethyl or diethyl esters of N-carboxymethyl-N-methyl-α-amino-2 or 3-toluic acid may be employed to give the higher dialkyl esters of these acids.

*Example 3*

Sixty parts of polyvinyl chloride and 40 parts by weight of 2-ethylhexyl N-carbo(2-ethylhexyl)oxymethyl - N - methyl - α - amino - 4 - toluate were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 34° C. When subjected to heat at a temperature of 325° F. for a period of 30 minutes the clarity and color of the molded sheet were substantially unchanged. Tests of the water-resistance properties of the plasticized material employing the test procedure described above showed a solids-loss of 0.14 per cent and an 0.70 per cent water absorption value.

Instead of the ester employed in the example above, other esters of the present N-carboxyalkyl-α-aminotoluic acids may be used to give similarly valuable plasticized polyvinyl chloride compositions. Thus, by employing 40 parts by weight of di-n-octyl, di-isoamyl, di-n-hexyl or dibutyl esters of N-carboxymethyl-N-methyl-α-amino-4-toluic acid or of N-carboxymethyl-α-amino-2-toluic acid with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

While the above examples illustrate a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 per cent to 20 per cent is preferred. The present esters are compatible with polyvinyl chloride over a wide range of concentrations, up to 50 per cent of esters based on the total weight of the plasticizer composition yielding desirable products.

Although the invention has been described particularly with reference to the use of the present aralkyl amino dicarboxylates as plasticizers for polyvinyl chloride, these esters may be advantageously employed also as plasticizers for copolymers of vinyl chloride, for example, the copolymers of vinyl chloride with vinyl acetate, vinylidene chloride, methyl methacrylate, acrylonitrile, butadiene, or styrene. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such additions in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

What we claim is:

1. Compounds having the general structure

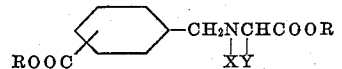

in which R is a member of the group consisting of hydrogen and alkyl radicals of from 1 to 8 carbon atoms, X is a member of the group consisting of hydrogen and the methyl radical and Y is a member of the group consisting of hydrogen and alkyl groups of from 1 to 4 carbon atoms.

2. N-carboxymethyl - N - methyl-α-amino-4-toluic acid.

3. Methyl N-carbomethoxymethyl-N-methyl-α-amino-4-toluate.

4. 2 - ethylhexyl carbo(2 - ethylhexyl)oxymethyl-N-methyl-α-amino-4-toluate.

5. The process which comprises contacting an amino compound having the general formula

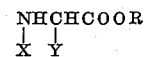

in which X is a member of the group consisting of hydrogen and the methyl radical and Y is a member of the group consisting of hydrogen and alkyl radicals of from 1 to 4 carbon atoms, and R is a member of the group consisting of hydrogen and alkyl radicals of from 1 to 8 carbon atoms, with a toluic acid compound having the general formula

in which R is a member of the group consisting of hydrogen and alkyl radicals of from 1 to 8 carbon atoms and Z is a member of the group consisting of chlorine, bromine and iodine, and recovering from the reaction product a dicarboxylic compound having the general formula

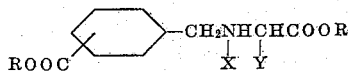

in which R is a member of the group consisting of hydrogen and alkyl radicals of from 1 to 8 carbon atoms, is a member of the group consisting of hydrogen and the methyl radical and Y is a member of the group consisting of hydrogen and alkyl radicals of from 1 to 4 carbon atoms.

6. The process claimed in claim 5 further defined in that said amino compound is contacted with said toluic acid compound in the presence of a basically reacting agent.

7. The process of preparing compounds having the general formula

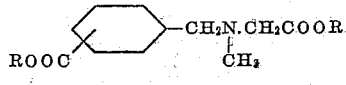

in which R is a member of the group consisting of hydrogen and alkyl groups of from 1 to 8 carbon atoms which comprises contacting, in the presence of a basically reacting agent, an amino compound selected from the group consisting of sarcosine and alkyl esters of sarcosine in which the alkyl group has from 1 to 8 carbon atoms with a compound having the general formula

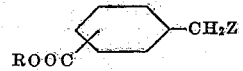

in which R is an alkyl group of from 1 to 8 carbon atoms and Z is a member of the group consisting of chlorine, bromine and iodine.

8. The process of producing N-carboxymethyl-N-methyl-α-amino-4-toluic acid which comprises contacting sarcosine with α-chloro-4-toluic acid in the presence of a basically reacting agent.

WILLIAM S. EMERSON.
ROBERT A. HEIMSCH.

References Cited in the file of this patent

UNITED STATES PATENTS

| Number | Name | Date |
|---|---|---|
| 647,263 | Heymann | Apr. 10, 1900 |
| 2,413,856 | Bersworth | Jan. 7, 1947 |
| 2,450,435 | McGillicuddy et al. | Oct. 5, 1948 |
| 2,518,525 | Curtis | Aug. 15, 1950 |